Jan. 28, 1958 R. S. SANFORD 2,821,271
LIQUID COOLED BRAKE WITH COPPER FRICTION SURFACES
Filed May 3, 1954 2 Sheets-Sheet 1
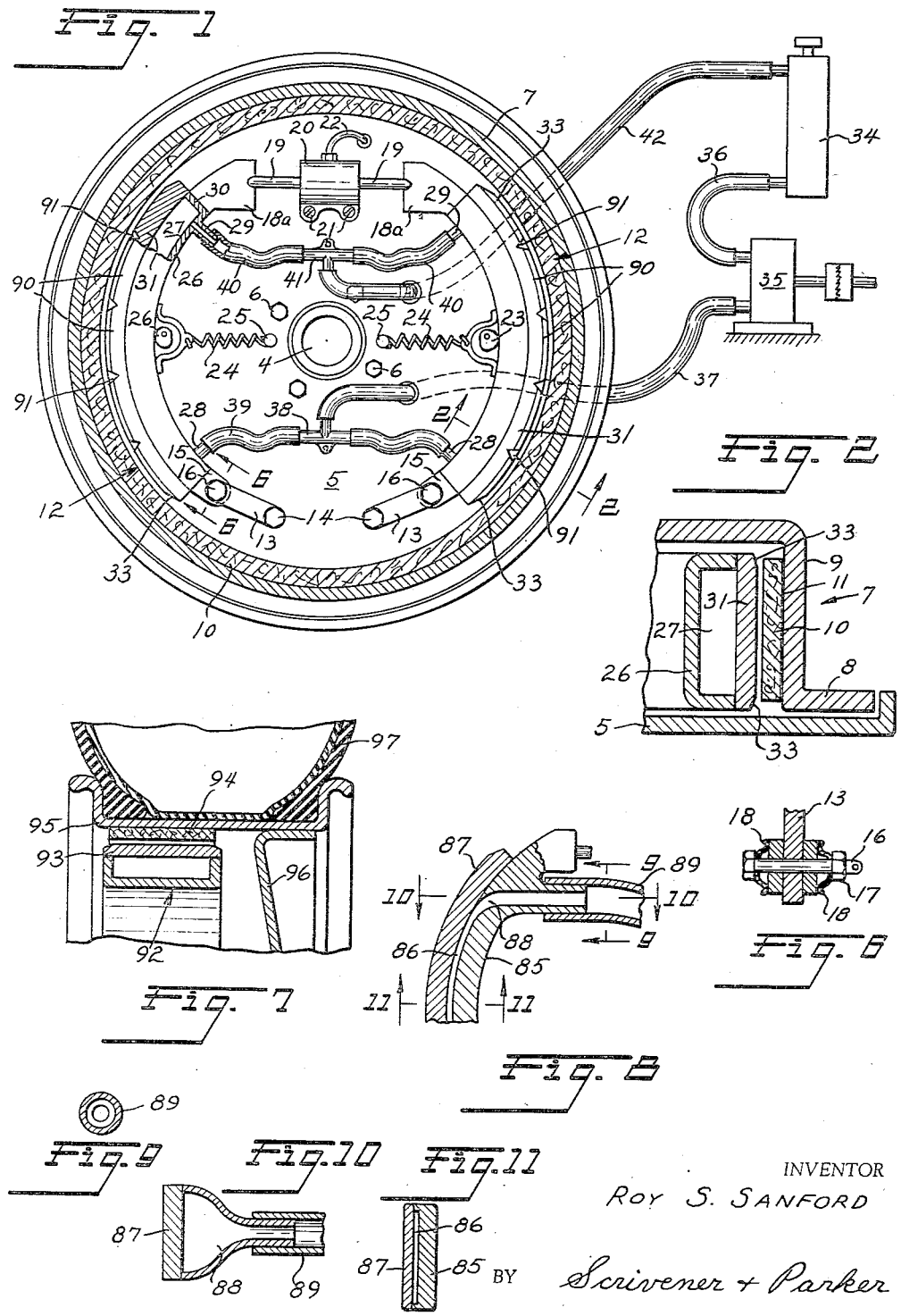
INVENTOR
ROY S. SANFORD
BY
Scrivener + Parker
ATTORNEYS

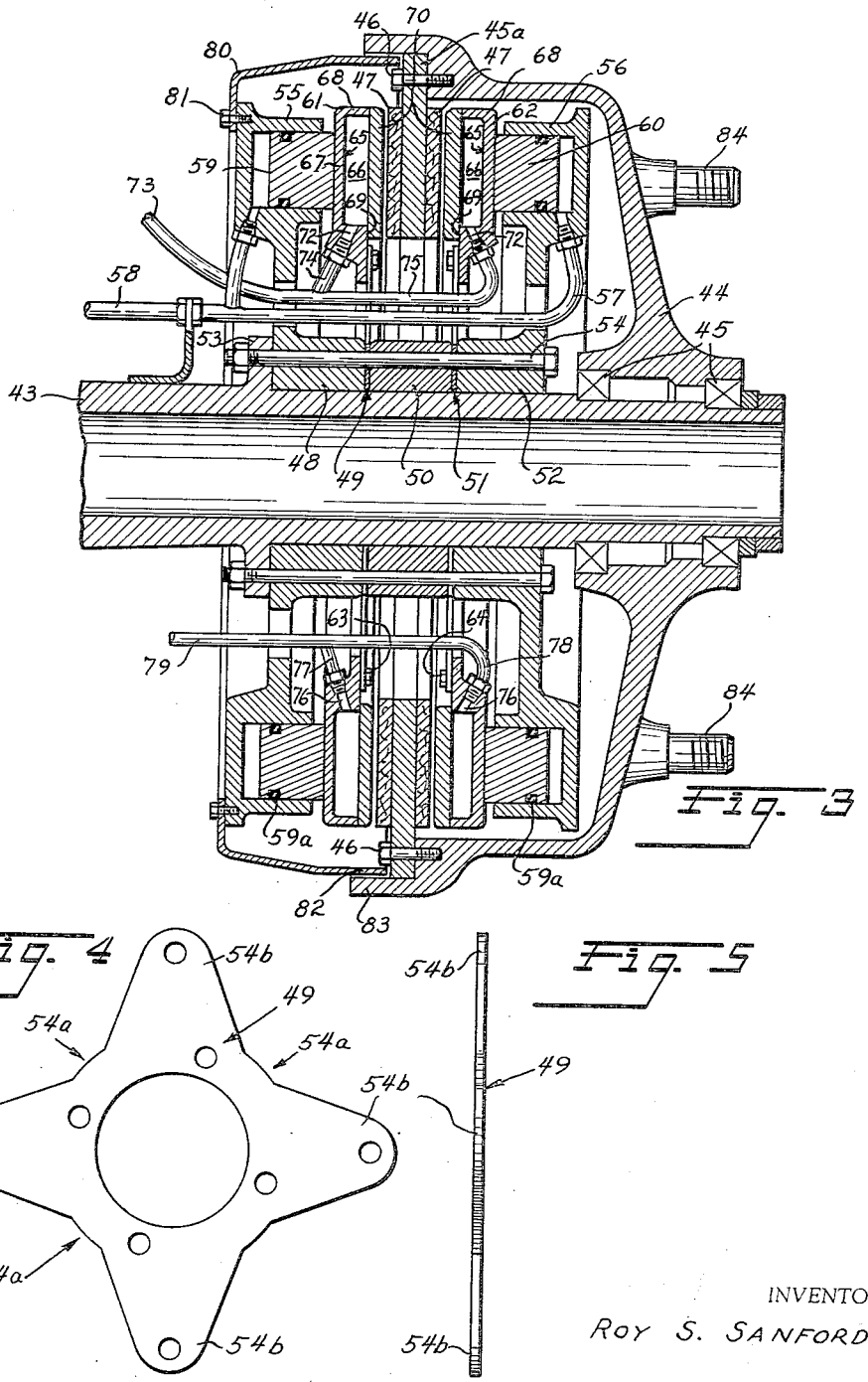

United States Patent Office 2,821,271
Patented Jan. 28, 1958

2,821,271

LIQUID COOLED BRAKE WITH COPPER FRICTION SURFACES

Roy S. Sanford, Woodbury, Conn., assignor to Roy S. Sanford, Woodbury, Roger H. Casler and James O. Eames, Washington, and Wilfred A. Eaton and Erling D. Sedergren, Woodbury, Conn.

Application May 3, 1954, Serial No. 427,210

7 Claims. (Cl. 188—264)

This invention relates to brake mechanism, and more particularly to friction brake mechanism for automotive vehicles.

Although friction brakes have been used extensively on automotive vehicles as well as in various commercial and industrial applications for over half a century, the problems of excessive heating, fade, and drum expansion and distortion have never been satisfactorily overcome, although all of these problems have been the subject of extensive research for many years.

Friction brakes are normally of either the internal annular drum type or the disc type, and most of the above defects have presented serious difficulties in connection with the operation of either type as used in automotive and industrial applications up to the present time.

The conventional drum brake comprises an annular brake drum of cast iron or steel attached to the vehicle wheel, and brake shoes faced with non-metallic friction lining on the axle adapted to engage the metal inner surface of the drum. Since the lining, often largely composed of asbestos, is a heat insulator, most of the heat developed during braking must be absorbed and dissipated by the metal drum. If the brake is applied with appreciable force for a period of more than a few seconds, the drum heats up and expands, making it necessary, in the case of a hydraulic brake, for example, for the operator to push the brake pedal further down to compensate for this expansion. At the same time, the temperature at the engaging surfaces or interface of the drum and lining increases to such an extent that the coefficient of friction of the engaged friction materials falls off rapidly, causing what is commonly known as "fade," a condition which makes it impossible to stop the vehicle without excessive pedal pressure. In making a single emergency stop from 60 to 70 miles per hour, severe and even dangerous fade is often experienced on many automotive vehicles in use at the present time, and this has resulted in a great many serious or fatal accidents.

In addition to the foregoing, the excessive heat developed under severe braking conditions often raises the temperature of the lining above its decomposition temperature, as a result of which rapid disintegration of the lining occurs.

Due to the fact that most of the heat of braking in the conventional brake must be absorbed in the metal drum, the temperature of the latter increases to a value sufficient to cause severe distortion of the drum with consequent unsatisfactory braking action. The heat of the brake drum also has a detrimental effect on the tires, particularly on commercial vehicles where the service required of the brakes is unusually severe. "Heat checking" of drums is also a common occurrence, particularly in truck and bus service, the heat of braking causing cracks on the interior surfaces of the drums which render them unfit for service in a short time.

In the case of disk brakes, expansion of the brake parts with increased temperature does not increase pedal travel as is the case with brakes of the annular drum type, but there are other difficulties involved. In most cases brake shoes are arranged to simultaneously engage opposite sides of a rotating metal disk, the heat of braking being absorbed and dissipated primarily by the disk. Such a brake can, in a given overall size, provide a large braking surface with consequent low unit area loading of the friction surfaces, but only if substantially the entire surface of both sides of the disk is engaged by the brake shoes. However, such brakes have been found to be extremely difficult to cool properly, and consequently, the present tendency is to use brake shoes which engage only a small portion of the two sides of the rotating disk. This promotes cooling, in view of the fact that a large portion of the disk surface is exposed to the air rather than being masked by the brake shoe, but at the same time, such a construction subjects the friction material on the brake shoes to high localized temperatures as well as to an extremely high unit area loading with consequent rapid wear, and these brakes are subject to fade in the same manner as the drum brake.

The difficulties outlined above are inherent in the brakes of conventional type now being used on automotive vehicles as well as in industrial applications, and it is an object of the present invention to provide simple and efficient brake mechanism so constituted as to overcome these difficulties.

A further object is the provision of brake mechanism so constituted as to substantially eliminate fading of the brakes under sever conditions of operation.

A still further object is the provision of brake mechanism so constituted as to be substantially unaffected by the heat developed during operation of the brakes.

Another object is the provision of brake mechanism wherein appreciable thermal expansion and distortion of the drum is substantially eliminated.

A further object is the provision of brake mechanism wherein the braking capacity can be materially increased without increasing the overall size of the brake assembly.

Yet another object is the provision of brake mechanism so constituted as to prevent overheating of the vehicle tires due to operation of the brakes.

Still another object is to provide a brake mechanism of the foregoing character which comprises a novel combination of brake elements including a brake drum having a heat insulating friction lining secured thereto and one or more braking elements movable into contact with such lining, the braking elements being hollow to provide chambers through which a liquid cooling medium is circulated, and the wear surfaces of such braking elements being in direct heat exchange relation with the cooling medium and being composed primarily of pure copper.

The above and other objects and novel features of the invention will appear more fully hereinafter from the following detailed description when taken in connection with the accompanying drawings. It is to be expressly understood however, that the drawings are utilized for purposes of illustration only and are not designed as a definition of the limits of the invention, reference being had for this purpose to the appended claims.

In the drawings, wherein similar reference characters refer to similar parts throughout the several views:

Fig. 1 is an axial sectional view of a brake mechanism embodying the principles of the present invention;

Fig. 2 is an enlarged fragmentary view in section, taken along line 2—2 of Fig. 1;

Fig. 3 is an axial sectional view of a modified form of brake mechanism embodying the invention;

Fig. 4 is a plan view of a detail of Fig. 3;

Fig. 5 is a side view of the detail of Fig. 4;

Fig. 6 is an enlarged fragmentary view in section, taken along line 6—6 of Fig. 1;

Fig. 7 is a partial view in section of still another modification of the invention;

Fig. 8 is a fragmentary view in section of a further modification of the invention;

Fig. 9 is a transverse sectional view of the conduit of Fig. 8 and taken along line 9—9 of the latter;

Fig. 10 is a sectional view taken along line 10—10 of Fig. 8; and

Fig. 11 is a sectional view taken along line 11—11 of Fig. 8.

Referring more particularly to Figs. 1 and 2, the novel brake mechanism of the present invention includes a support or vehicle axle 4 having a backing plate 5 suitably attached thereto as by means of bolts 6. A metal brake drum 7, shown in section and having a flange 8 and an annular portion 9, is mounted on a suitable hub, not shown, and the latter is mounted for rotation on the support 4 in the conventional manner, so that the drum may rotate on the support with the annular portion concentric therewith. A substantially nonmetallic friction lining 10 of heat insulating material, which may be largely composed of asbestos with a suitable binder, is secured to the inner face of the annular portion of the drum by a layer of adhesive 11, although rivets or other fastening means may be used if desired.

A pair of brake shoes 12 are mounted on the backing plate, and may be mounted on floating anchors as shown. In the arrangement illustrated anchor links 13 are pivotally connected to the backing plate by pins 14 mounted thereon, and to lower end portions 15 of the shoes by pins 16. The latter, as shown in more detail in Fig. 6, are threaded at their outer ends to receive nuts 17, which, when tightened serve to compress resilient friction washers 18 against the sides of shoe and portions 15, thus providing a friction connection between the shoe and link, the friction of which may be adjusted by tightening or loosening the nut 17. Suitable hold-downs or guides, not shown, may be provided in the customary manner to prevent lateral movement of the shoes relative to the backing plate.

The upper end portions 18a of the shoes are connected by push rods 19 to pistons, not shown, of a conventional hydraulic brake cylinder 20 attached to the backing plate 5 by cap screws or bolts 21 as shown, the cylinder being provided with a hydraulic conduit 22 connected to a hydraulic master cylinder of conventional type, also not shown. Adjustable stops are provided for fixing the release position of the brake shoes, these comprising cams 23 rotatably mounted on the backing plate and adapted to engage the shoes substantially midway between the ends thereof. Return springs 24 are connected between the centers of the shoes and pins 25 on the backing plate as shown.

In the embodiment illustrated in Figs. 1 and 2, the brake shoes 12, which are preferably of composite construction, include the end portions 15 and 18a previously referred to, and a portion 26 intermediate these end portions and integral with or rigidly connected therewith, thus providing an arcuate shoe construction. These portions are preferably formed of steel or other suitable metals, and may be cast or formed of parts welded together, depending on the type of structure desired. The central portion 26 is provided with a cooling fluid cavity 27, and inlet and outlet conduits 28 and 29 are arranged as shown to supply fluid and discharge fluid from the cavity.

The cavity 27 is bounded by a continuous side wall 30, and the open side of the cavity is closed by a friction element 31 formed primarily of pure copper, such as bus bar copper, which is formed in an arc corresponding to the inner surface of the brake lining 10 and is secured to the outer end of wall 30 in sealing engagement therewith by silver solder or by other suitable means. The friction element 31 is preferably provided with a beveled peripheral edge 33 in line with the outer surface of wall 30, for purposes to be more fully described hereinafter.

Although provision is made for cooling of the brake shoes, by means of a circulating fluid, it is contemplated that under most conditions of operation the fluid will be a liquid, and that the liquid will preferably be water or water containing a suitable anti-freeze medium, such as ethylene glycol. Referring more particularly to Fig. 1, illustrating a brake particularly adapted for use on a motor vehicle, the brake cooling system includes a radiator 34, which may be the vehicle radiator if desired, and a power driven circulating pump 35, which may be the pump for the vehicle engine cooling system or a separate pump as desired. The pump draws liquid from the radiator through a conduit 36 connected therebetween, and supplies it to the brake shoes through conduit 37 leading through backing plate 5 to a T fitting 38 attached thereto as shown. Conduits 39 lead from the T to inlets 28 of the right and left brake shoes 12, and the outlets 29 of the shoes are connected by conduits 40 to a T 41 secured to the backing plate. From there the liquid is returned to the radiator through conduit 42.

From the foregoing, it is seen that the invention provides a brake mechanism wherein the friction elements which engage during a brake application are a substantially non-metallic brake lining of heat insulating material on the interior surface of the annular drum and a friction element or wear surface of substantially pure copper on the brake shoe. One surface of the copper wall closing the brake shoe cavity engages the lining on the drum, and substantially the entire opposite surface is in direct heat exchange relationship with the circulating cooling liquid in the cavity of the brake shoe. In the event the bevel portion 33 is utilized, the entire inner surface of the copper friction element 31 directly opposite that portion of the outer friction surface of said element which engages the lining 10 is subjected to the action of the cooling fluid. In either case, the arrangement is such that heat developed at the friction interface is transmitted directly through the copper friction element to the cooling fluid, and no overheating of the non-metallic lining occurs. The lining insulates the metal of the drum from the heat developed during a brake application, and consequently the maximum temperature developed in the metal drum is so low as to eliminate entirely the problem of drum expansion, as well as the problem of drum distortion or checking due to overheating of the drum metal.

The present invention is also particularly adapted for use in the disk type brake, and referring to Fig. 3 of the drawings, such a brake may include a support or axle tube 43 having a wheel hub 44 rotatably mounted thereon as by means of bearings 45. A brake disk 45a is attached to the rim of the hub for rotation therewith by bolts 46, and friction disks 47 of substantially non-metallic heat insulating brake lining material are adhesively or otherwise secured to either side of the disk as shown. Mounted on the axle tube 43 are brake actuator carrier 48, a resilient brake shoe supporting element 49, preferably of spring steel, a spacer 50, a second brake shoe supporting element 51, which may be of the same construction as the element 49, and a second brake actuator carrier 52, these parts on the axle tube being held together and clamped to a flange 53 on the axle tube by bolts 54. Openings 54a between spokes 54b of the supporting elements provide a passage for the liquid coolant conduits and hydraulic lines described hereinafter.

The carriers 48 and 52 are provided with annular cylinders 55 and 56 interconnected by conduit 57, a conduit 58 connecting the latter to the brake master cylinder, not shown. Annular pistons 59 and 60 are respectively slidably mounted in the above cylinders and arranged to bear against brake shoes 61 and 62 respectively, the latter being attached by bolts 63 and 64 to the corresponding shoe supporting elements 49 and 51. The pistons 59 and 60 are provided with conventional seal members 59a.

The brake shoes, which may be of identical construction, each includes an annular strength member 65, which may be of suitable metal such as steel or cast iron, the member being formed with a preferably continuous annular cavity 66 having a closed bottom portion 67 and bounded by a continuous wall 68 having an end face 69 adapted to receive an annular friction element or disk 70 of substantially pure copper secured thereto by silver solder or by other suitable means.

With the friction element secured to the member 65 the cavity becomes a chamber for cooling liquid, and in order that such liquid may be circulated through the chambers of the two brake shoes, the cavities are provided with upper ports 72 connected to a conduit 73 by conduits 74 and 75, and lower ports 76 connected by conduits 77 and 78 to a common conduit 79. When the brake is in operation one of the conduits 73 or 79 is connected to the upper conduit 42 of radiator 34 in Fig. 1, and the other is connected to pump outlet 37, so that with the pump 35 running, liquid is circulated through the cavities of the brake shoes in direct heat exchange relationship with the inner surfaces of the copper friction elements 70 directly opposite their friction surfaces.

The resilient brake shoe supporting elements 49, shown in detail in Figs. 4 and 5, are so positioned by members 48, 50, and 52, as to normally hold the copper friction elements 70 out of engagement with the friction lining rings 47, and due to their resilience, act to return the brake shoes and their copper elements to this position on release of the brakes, the brakes being applied by the application of pressure to the pistons in cylinders 55 and 56, and the pistons bearing directly against the annular brake shoe members 65. It is also noted that the resilient brake shoe supporting members are so constituted as to take the torque of the brake shoes during a brake application. A dust shield 80 is attached to member 48 by screws 81, and a flange 82 on the shield cooperates with a flange 83 on the hub 44 to seal the brake assembly against the entrance of dirt and water.

Thus a simple and compact disk brake is provided, and the novel use of circulating liquid cooling means in connection with the copper friction elements operating against the non-metallic heat insulating friction elements, permits the use of the entire area on both sides of disk 45a for braking, and at the same time entirely eliminates the possibility of overheating of the piston seals 59a and of the brake fluid in the cylinders without resorting to the use of special heat insulation or other expedients. The metal of disk 45 is insulated from the heat of braking by non-metallic friction disks 47, and consequently no appreciable thermal distortion of the disk is experienced in service, and the hub bearings and rubber tires are likewise fully protected from the braking heat which might otherwise cause leakage of lubricant from the bearings and deterioration of the rubber tires. Wheel mounting studs 84 are provided in the usual manner on the hub 44. As compared with conventional disk brakes, which are normally not enclosed, it will be noted that the brake illustrated can be fully enclosed without causing overheating of the brake, a distinct advantage when operating under conditions which would otherwise cause dirt and water to enter the brakes and prevent satisfactory operation.

While it might appear that the mere circulation of a cooling liquid through the brake shoes, assmuming a liquid discharge temperature below the boiling point of the liquid, would be sufficient to carry away the heat developed during braking regardless of the velocity of liquid flow, this is not necessarily the case, and particularly under the severe conditions of heavy duty brake operation, it may be desirable and even essential to use a relatively high velocity of liquid flow through the cooling chamber of the shoe. Even though the temperature of the discharged liquid may be well below its boiling point, boiling may occur at the inner surface of the copper element to form bubbles providing a vapor or steam barrier along the surface which would interfere with the efficient transfer of heat from the copper friction element to the circulating liquid.

A high liquid velocity interferes with the formation of such bubbles or carries them away as fast as they are formed, thus permitting a fresh supply of cooling liquid to engage the surface. In view of this, it is contemplated that in some installations, in order to obtain the highest liquid velocity in the shoe for a circulating pump of given characteristics, the cross-sectional area of the liquid passage in the shoe should be substantially equal to or preferably, considerably less than the cross-sectional area of the supply and discharge conduits. In other words, in order to obtain the highest velocity in the shoe for a pump of a given capacity, the restriction to liquid flow should be substantially constant throughout the liquid circuit, or if a localized restriction exists, this should be in the cooling chamber of the shoe itself rather than elsewhere in the circuit. If the pump used is of the positive displacement type, high velocities can be obtained through the shoes provided conduits are selected which will withstand relatively high pressures.

Such an arrangement is illustrated in Figs. 8, 9, 10 and 11. A brake shoe strength member 85 is provided with a very shallow liquid cavity 86 with a substantially pure copper friction element 87 closing the open side of the cavity. At either end of the shoe the cavity merges into a nozzle portion 88, the left end being of the same shape as the liquid passage through the shoe, and the right end being of preferably circular cross-section having an area substantially equal to or greater than that of the passage through the shoe. A conduit 89 having an area equal to or greater than that of the right end of the nozzle portion is connected to the nozzle as shown, and the entire circulating system is so constituted in accordance with the above description as to insure the highest rate of flow possible in the shoe with the particular pump utilized. In systems so constituted that a very high pressure can be maintained in the supply conduit at the entrance to the cooling chamber of the shoe, the restriction in the shoe passage can be materially increased, resulting in a very high velocity while at the same time forcing a sufficient volume of liquid through the shoe to insure absorption of the heat developed without undue heating of the liquid.

Relating the above to the mechanisms shown in Figs. 1 and 2, wherein the cooling chambers of the two shoes are connected in parallel, the cross-sectional area of the chambers would be materially decreased, and the relationship between the areas of the shoe passages and the areas of the conduits would be substantially such that the areas of each of conduits 39 and 40 would be equal to or greater than the corresponding shoe passage area, and the cross-sectional area of each of conduits 37 and 42 would be equal to or greater than the sum of the areas of the two conduits 39 or 40 respectively, it being understood that the T's 38 and 41 would be proportioned accordingly. It will be understood that if desired, the mechanism of Figs. 8–11, may also be applied to the forms of the invention shown in Figs. 3 and 7.

In a brake of the type shown in Fig. 1, we have an arcuate brake shoe which may be of bimetallic construction, as well as one in which, due to the liquid cooling means provided, the outer surface layer of the copper friction element, when in use, is subjected to relatively high localized temperatures as compared with the other portions of the shoe structure. This may lead to thermal distortion of the shoe during and following brake applications due to the action of the shoe as a bimetallic member acting in the manner of a thermostat, as well as to thermal distortion due to the relatively high temperature differential which necessarily exists between the friction surface of the copper element and its inner surface, as well as between the copper element and the metal forming the strength member. Although this discussion is primarily directed toward a bimetallic arcuate shoe of the type shown in Fig. 1, it is also considered applicable to liquid cooled shoes of non-bimetallic construction wherein a marked temperature differential may exist between the friction surface and the body portion of the shoe, as well as to the liquid cooled shoe elements of disk brakes, it being well known that the disk elements of such brakes often tend to distort or "dish" under the action of heat.

In order to minimize such distortion, each of the copper friction elements 31 of the brake shoes 12 of Fig. 1 may be divided into a plurality of separate lining engaging portions 90 by suitable means such as grooves 91 extending transversely across the outer surface of the copper element. These grooves preferably extend from one edge of the copper element to the other, and extend into the copper, about halfway in the instance shown, so as to reach a zone which, during brake application, is not heated sufficiently to cause alternate expansion and contraction of the copper so as to cause permanent distortion of the shoe.

In this connection it has been found that in the case of a shoe of the type shown in Fig. 1 having a steel strength member and a copper friction element, the entire shoe tended to distort after use in such a manner that the arc of the copper element changed and the end portions of the shoe only, engaged the inner surface of the brake lining on the drum. It was found that the use of the transverse grooves overcame this difficulty, and it was further found that in the case of a brake shoe that had been so distorted in service, the cutting of the grooves apparently relieved the stresses and permitted the shoe to return to its original shape.

It is also apparent that in a brake of this type, even though a high degree of cooling is provided, powdered particles of brake lining between the brake shoe surface and lining surface tend to move along the brake shoe from one end to the other, increasing their temperature as they go along and possibly even reaching or approaching incandescence. The use of the above grooves reduces the time during which these particles are subjected to an abrading and heating action between the shoe and lining, and prevents them from getting hot enough to damage the remaining portion of the lining.

It will be understood that the transverse groove construction 91 heretofore described, may also be used in connection with the friction elements of the brake mechanisms of Figs. 3 and 7.

In view of the fact that the braking heat is absorbed to a large extent by the brake shoe and thereafter dissipated by the circulating liquid coolant, rather than being absorbed by the drum, the brake forming the subject matter of the present invention is particularly adapted for certain special applications, such as in airplane brakes where weight is an extremely important item. Such an arrangement is shown in Fig. 7, wherein a liquid cooled brake shoe 92, having a copper friction element 93, is adapted to engage a non-metallic brake lining 94 secured to the inner surface of a tire rim 95, the latter being secured to a metal wheel 96 by rivets or welding, and having a pneumatic tire 97 mounted on the outer surface of the rim. Being insulated by the brake lining, the rim never gets hot enough to damage the tire, the brake drum weight is eliminated, and the wear is taken by the replaceable non-metallic lining rather than by the metal rim. Thus, there is provided a brake wherein the tire rim acts as the brake drum, the shoe acting against the inner surface of the drum and the tire being mounted on the outer surface thereof.

Brakes of the friction type have as their primary function the transformation of energy into heat, and it has long been the opinion of those skilled in the art that excessive heat is the cause of most of the above referred to difficulties encountered in the operation of well designed brakes. It is often assumed that if this heat could be removed in such a manner as to keep the brake elements at a low temperature, all of the above difficulties would be overcome. This is not the case, however, as it has been found that even though efficient heat removing means and materials are provided, particular combinations of coacting friction materials are necessary. It has been determined that the use of some of the combinations which have even higher heat removing capacity than the combinations forming the subject matter of the present invention result in brakes which, though most efficiently cooled, may fade appreciably or may be so uncontrollable and deteriorate so rapidly as to be entirely unsuited for use.

By way of example, water cooled brake shoes of the type shown in Fig. 1 having copper friction elements 31 which are known to be excellent heat conductors, were installed on a test vehicle and operated at conventional speeds of 25 to 60 miles per hour against conventional cast iron drums. Although metal to metal brakes such as steel against steel or cast iron or bronze against cast iron have been operated in the past fairly satisfactorily, although not as smoothly as desired, the above described brake, having the shoes cooled most efficiently and having the metal of the brake drums in direct contact with the brake shoes and adapted to absorb and radiate a large amount of heat in addition to that taken away by the water, grabbed so badly that the car could not be safely driven on the highway. On removing the drums, it was found that iron had been torn from their surface and imbedded in the copper.

The available literature on the subject of friction brakes indicates a general assumption on the part of those skilled in the art, and particularly those in the automotive field, that, using brakes of substantially conventional construction, satisfactory and much improved brake operation is primarily a matter of providing improved heat resistant friction lining materials, particularly those of the substantially non-metallic type, as well as a matter of providing improved means for the dissipation of heat. In connection with the latter point, the major portion of the research work has apparently been directed toward the development of more heat resistant brake linings and to improved brake drum designs, many of the latter being provided with cooling fins of the same or other metals than the metal forming the friction surface, or being of composite construction having an outer structural member of a metal such as aluminum and an inner friction lining of another metal such as cast iron.

Although little definite information is available as to the actual temperatures developed between the rubbing surfaces of a friction brake at the interface, and there appears to be no reliable way of accurately measuring these temperatures, it is believed that there is a critical temperature at the interface, which, if exceeded, will result in severe fading, and which, if exceeded to any great extent, will result in decomposition or rapid disintegration of one or both of the friction materials used in the brake. On the other hand, if this critical temperature is not exceeded, the brake may be operated under the most severe conditions without the occurrence of appreciable fade and without destruction of the lining.

As indicated heretofore, an intensive study has been made by brake specialists since the dawn of the automobile era to overcome the problems of fade, decomposition of lining, drum expansion, drum distortion, heat-checking of drums, and over-heating of tires in connection with the operation of friction brakes, and although detailed advances have been made in the art, including improved brake lining materials and improved drums designed to more readily dissipate heat and to provide longer drum and lining life, all of these advances have represented at best only a partial solution of the problem, and the difficulties in the meantime have been materially increased by the universal use of smaller diameter wheels which limit brake drum diameters, wide spring bases which serve to limit brake drum width, higher horsepower and corresponding higher speeds, fender constructions which more effectively shield the brake mechanisms and prevent the dissipation of heat therefrom, and the use of steel wheels which serve to conduct a large amount of heat from the drums to the tire rims.

Dynamometer tests were also conducted, the dynamometer being set to approximately simulate vehicle speeds of either 40 or 160 M. P. H. The actual brake drum speeds were respectively 500 and 1710 R. P. M., giving a brake energy ratio at the same torque of 3.42. Torque, unless otherwise stated hereinafter, was maintained at 1000 pound inches, hereinafter referred to as standard torque, and since a shoe of 13 square inch area was used in the tests, the heat dissipation per square inch of shoe was about .485 B. t. u. per second at the low speed and about 1.658 B. t. u. per second at the higher speed. It is to be understood that this represents the total heat developed by the single dynamometer brake shoe under the above conditions, and that this heat is not all dissipated by the shoe itself, it being obvious that some heat is dissipated by the drum, and that the distribution of heat dissipation is dependent on the arrangement, structure, and materials of the particular brake components involved.

The water cooled shoe having the bus bar copper friction element of the present invention and as heretofore described, was run continuously for an hour at standard torque in contact with a commercial grade of molded non-metallic brake lining at the lower speed, such lining having been secured to a brake drum in accordance with the invention. During this entire period, the brake shoe was urged against the lining with a uniform force sufficient to produce the aforementioned standard torque of 1000 pound inches. The surface of the copper was highly polished at the end of the test and showed no evidence of wear. Brake operation was smooth and quiet. In a subsequent test, the same shoe was operated at the same speed and torque, being repeatedly applied for 3-minute intervals with a 1-minute release period between each interval until the total applied time was 60 minutes. The hydraulic line pressure was substantially unchanged throughout both tests, indicating clearly that there was no fade whatsoever. Thereafter the same shoe was operated for one-half hour of application, being applied for 2 minutes with a 1-minute interval between. The total time that the brake shoe was applied in these three tests was representative of a brake on a vehicle being dragged substantially continuously at the above rate of energy dissipation for a distance of 100 miles, a performance which cannot even be remotely approached by any of the brakes now in use on pleasure or commercial vehicles. There was no evidence of fade in these tests. In all cases the brake parts remained relatively cool, and at the end of the first 1-hour test recorded above, the lining temperature at the friction surface was 225° F. and the highest drum temperature was 220° F.

Further tests were made on the dynamometer with different combinations of materials, during which the degree of water cooling used was substantially the same in the case of all shoes of the liquid cooled type and standard torque was maintained unless otherwise stated. A water cooled steel shoe was operated against non-metallic lining at the higher speed and smoked in 2 to 3 seconds. A water cooled steel shoe was then plated on the outer surface thereof with electrolytic copper .030" thick, and in this case, the thin copper layer was not in direct heat exchange relation with the cooling water circulating through the steel shoe. When this shoe was operated against non-metallic lining at the higher speed, the lining smoked extensively in 2.6 seconds. At the lower speed, the hydraulic line pressure increased 180% during a 3-minute application. At double torque at the lower speed, smoke was observed after the brake had been applied for 6.6 seconds.

A cast aluminum water cooled shoe having relatively high conductivity compared with steel and operated against non-metallic lining at the higher speed and standard torque, smoked at he end of a 1-second application, and at the lower speed at double torque, smoked at the end of a 32-second application.

Dynamometer tests were also conducted with air-cooled metal shoes operating against non-metallic lining on the interior of the drum. For example, a copper shoe of 5" width and ½" thickness, smoked after 9 to 11 seconds at the higher speed and standard torque, and operation was very erratic. A bronze air cooled shoe operated at the lower speed and standard torque, heated sufficiently to damage the lining after a 5-second application. A standard type brake shoe having a commercially available non-metallic brake lining thereon and operating against a cast iron drum, at the lower speed and standard torque, started to smoke at the end of 12 seconds of application and smoked badly at the end of 32 seconds, while at the higher speed and standard torque, smoke occurred at the end of applications varying in length from 6 to 11 seconds.

The present invention is based upon the discovery that a copper friction element, or an element formed primarily of substantially pure copper, is an excellent and in fact outstanding friction material for brakes, but only when used in the proper combination. Air cooled copper, as the term air cooled is commonly used, was found to be entirely unsatisfactory when used with non-metallic lining. Water cooled aluminum against non-metallic lining was found to be entirely unsatisfactory.

As further evidence of the successful operation of the invention, a test car of well known make, having a gross weight under test conditions of about 4300 lbs., was equipped with water cooled copper shoes of the type described, cooled independently of the engine cooling system and operating against substantially non-metallic lining on the drums made as a stock item by a well known brake lining manufacturer, and the car was tested by a competent race and test driver. At the outset he dragged the brakes continuously for a distance of over two miles with the transmission in low gear and with the brakes dragging to such an extent that the water in the engine radiator was boiling, and during this period he was able to slide the wheels at will, indicating no fade. Immediately thereafter he made repeated stops at speeds ranging from 60 to 80 M. P. H. and at substantially maximum deceleration. He reported that there was absolutely no evidence of fade during these tests, and that he knew of no other brake that could be operated under such conditions without severe fading.

The same car, equipped with the brakes forming the subject matter of the instant invention, was then subjected by a prominent manufacturer of brake lining to his standard brake lining test for the make of automobile involved. The test comprised generally and in the order named, 150 burnishing stops from 30 M. P. H. at a deceleration rate of about 13 ft. per sec.$^2$, 100 break-in stops from 30–40 M. P. H. at about 16 ft. per sec.$^2$, seven fade test stops from 70 M. P. H. at 21 ft. per sec.$^2$, and seven recovery stops from 30 M. P. H. at 21 ft. per sec.$^2$. This is the lining manufacturer's standard fade and recovery test for the particular test car and the particular lining involved, and no fade whatever was recorded. The term "recovery" relates to the time required for the brakes to regain their normal effectiveness after fade has occurred, and no recovery time was required in the present instance. Since there was no fade, it is obvious that no recovery time was required, and the tests so indicated. Subsequently the same car with the same brakes was subjected to 190 stops one mile apart from speeds of 40–50 M. P. H. at a deceleration rate of 21 ft. per sec.$^2$, with no evidence of fade whatsoever. It is understood that equivalent tests on conventional brakes now in use always show very serious fade, which is often sufficient to require increases in pedal pressure of 100% or more. In fact, it is believed that aside from the brake forming the subject matter of the present invention there is no other friction brake at present known, whether it be an experimental brake or one in regular production, that will not fade appreciably under the above test conditions.

In addition to the foregoing, the following additional test has been actually conducted. A racing car, of well known make, and having a gross weight of approximately 2800 pounds was equipped with the brake mechanism of the invention as disclosed in Fig. 1. This car was capable of accelerating from a dead stop to 110 M. P. H. in eleven seconds with a top speed of approximately 160 M. P. H. on a straightaway. In the test of the invention, six successive stops were made from a speed of 145 M. P. H. and during each stop it was possible to lock the wheels. The results of this test conclusively prove that there was no fade in the brake mechanism of the invention.

In the foregoing, reference has been made to the use of non-metallic and substantially non-metallic friction linings which are suitably attached to the brake drum. Such terms are intended to mean those present day commercial brake linings of the molded or woven type which are either entirely free of any metal whatsoever or may include a relatively small percentage or amount of metal particles or wires incorporated therein. Such terms are intended to exclude all-metal linings.

Reference has also been made in the foregoing to the use of the copper friction elements which are secured to the liquid cooled brake shoes and which form the friction surfaces for engagement with the substantially non-metallic friction lining. It has been found that such copper friction elements must be of a non-porous character impervious to the liquid coolant and wherein the constituent particles are fused together to form a solid and continuous metal mass, which mass must be in direct heat exchange relationship with the liquid cooling medium, in order to function in accordance with the invention and to derive the beneficial results therefrom as heretofore set forth.

It is within the purview of this invention that the term "copper" as heretofore applied to the friction elements 31, 70 and 93 and as used in the appended claims includes alloys of copper as well as the commercially available metal known in the trade as copper and which consists of at least 99% pure copper in combination with traces of other elements. The term "copper" as used in the appended claims also means copper as defined in the preceding sentence and which in addition, possesses the physical characteristics of being non-porous and impervious to liquid, and having the constituent metal particles fused together to provide a solid and continuous metal mass.

Commercially available grades of the metal copper are listed in the pamphlet Commercially Important Wrought Copper Alloys, copyright 1948, Chase Brass and Copper Co., Waterbury, Conn., page 22, and in the pamphlet Revere Copper and Copper Alloys, copyright 1949, Revere Copper and Brass Inc., New York, N. Y., page 5.

From the foregoing it is apparent that the invention is not limited to the specific forms of construction illustrated but may be embodied as well in other equivalent forms of construction within the scope of the appended claims.

What is claimed is:

1. In a brake mechanism having a support and a pair of brake elements mounted for relative rotational movement thereon, the combination of a substantially non-metallic heat-insulating brake lining of relatively low heat conductivity on one of the elements, a friction facing primarily of copper of relatively high heat conductivity on the other of said elements having one surface positioned for frictional engagement with the surface of said lining, means for maintaining a circulating cooling liquid in engagement with the surface of said copper facing directly opposite said one surface, and means for bodily moving one of said elements toward the other to effect direct physical engagement of said one surface of the copper with the surface of the brake lining.

2. A brake mechanism as set forth in claim 1 wherein said one brake element comprises a disk having a flat annular ring of substantially non-metallic heat insulating lining of relatively low heat conductivity thereon, and wherein said other brake element comprises a disk having a friction facing primarily of copper of relatively high heat conductivity thereon and wherein the arc of engagement between the annular ring and the friction facing when one of the elements is bodily moved toward the other is substantially 360°.

3. A brake mechanism as set forth in claim 1 wherein said one brake element comprises an annular tire supporting member having a continuous facing of substantially non-metallic heat-insulating friction material secured to its inner annular surface, and wherein said other brake element is arcuate in shape and is provided with an arcuate friction element of copper, and wherein the cooling liquid engages substantially all the surface on one side of said copper element.

4. A brake mechanism as set forth in claim 3 wherein the copper friction element comprises at least 99% pure copper.

5. In a frictional brake mechanism of the type comprising a support having a member rotatably mounted thereon and a brake shoe mounted on the support and bodily movable into engagement with said rotating member, the improvement which includes a lining of substantially non-metallic friction material secured to the rotating member, and said brake shoe comprising a copper friction element engageable with said lining, and a rigid supporting member for the copper friction element mounted on said support for bodily movement toward and away from the lining on said rotating member, said supporting member and copper friction element forming therebetween a channel for cooling liquid having spaced ports for the admission and discharge of circulating cooling liquid to and from said channel, said supporting member being secured to said copper friction element in sealing engagement therewith with the copper element forming a wall of said channel, and substantially the entire inner surface of said copper friction element directly opposite the outer surface thereof engageable with said friction lining being directly exposed to the action of a cooling liquid circulated through said channel between said ports.

6. In a brake mechanism having a support, a member rotatably mounted on the support, and a brake shoe mounted on the support for bodily movement toward and away from said rotatable member, and means for bodily moving said brake shoe, the combination of a substantially non-metallic heat-insulating brake lining on the rotatable member, and the brake shoe comprising a strength member having a channel for cooling liquid therein having spaced apart ports for the admission and discharge of cooling liquid to and from said channel, and a friction element formed primarily of copper secured to said strength member and forming a wall for said channel, said element having one surface positioned for direct frictional engagement with the surface of said lining on bodily movement of said shoe by said moving means and having substantially all of the opposite surface thereof directly in line with said one surface exposed to the action of a circulating cooling liquid circulating in said channel between said ports, and means for maintaining the circulation of a cooling liquid in engagement with said opposite surface of said element in said channel.

7. In a brake mechanism having a support, a member mounted for rotation on the support, a substantially non-metallic heat-insulating brake lining on said member having a friction surface, a brake shoe bodily movable on the support having a channel for cooling liquid formed therein and means for circulating liquid through said channel, said shoe including means providing a direct heat conducting path for the direct conduction of heat between the friction surface of said lining and a circulating cooling liquid in said channel, said means comprising a copper member forming one wall of said channel and having an outer surface directly engageable with the friction surface of said lining and having a corresponding inner surface directly exposed to the action of cooling liquid in said channel, and means for bodily moving said shoe to effect direct physical engagement of the outer surface of said copper wall with the friction surface of said lining.

References Cited in the file of this patent

UNITED STATES PATENTS

| | | |
|---|---|---|
| 464,949 | Alden | Dec. 15, 1891 |
| 1,935,713 | Herzinger et al. | Nov. 21, 1933 |
| 1,978,687 | Pearmain et al. | Oct. 30, 1934 |
| 2,012,662 | Frank | Aug. 27, 1935 |
| 2,299,208 | Bloss | Oct. 20, 1942 |
| 2,382,570 | Kraft | Aug. 14, 1945 |
| 2,581,941 | Shinn et al. | Jan. 8, 1952 |
| 2,664,176 | Whalen | Dec. 29, 1953 |
| 2,682,320 | Chamberlain et al. | Jan. 29, 1954 |